(12) United States Patent
Hoffman

(10) Patent No.: US 7,021,810 B2
(45) Date of Patent: Apr. 4, 2006

(54) ILLUMINATED REMOTE CONTROL DEVICE

(76) Inventor: Lawrence Andrew Hoffman, 877 SW. Summit View Dr., Portland, OR (US) 97225

(*) Notice: Subject to any disclaimer, the term of this patent is extended or adjusted under 35 U.S.C. 154(b) by 73 days.

(21) Appl. No.: 10/625,136

(22) Filed: Jul. 22, 2003

(65) Prior Publication Data

US 2005/0018413 A1    Jan. 27, 2005

(51) Int. Cl.
*F21V 8/00*    (2006.01)

(52) U.S. Cl. .......................... 362/577; 362/24; 362/26; 362/85; 362/116; 362/602

(58) Field of Classification Search .................. 362/24, 362/26, 27, 85, 109, 116, 234, 577, 602
See application file for complete search history.

(56) References Cited

U.S. PATENT DOCUMENTS

| | | | |
|---|---|---|---|
| 5,568,367 A * | 10/1996 | Park | 362/109 |
| 5,711,588 A * | 1/1998 | Rudisill | 362/24 |
| 6,598,987 B1 * | 7/2003 | Parikka | 362/26 |

* cited by examiner

*Primary Examiner*—Stephen Husar
(74) *Attorney, Agent, or Firm*—Paul J. Fordenbacher, Esq.; Silicon Forest Patent Group

(57) ABSTRACT

An illuminated remote control device providing illumination in the visible spectrum and the functionality of a wireless signal transmitter. Light projects from one or more translucent portions of the remote control device. The illuminated remote control device comprises a housing defining an outer surface and a cavity therein. The housing comprises at least one translucent portion adapted for the transmission of light from the cavity to the outer surface of the housing. At least one control feature is provided to operate transmitter electronics and/or the light source housed in the cavity. The light source produces light within the cavity, the light being then guided from the cavity to the surface by a translucent portion of the housing. The illumination provides the user with an increased ability to see or be seen in the dark and provides illumination that is visually appealing.

36 Claims, 4 Drawing Sheets

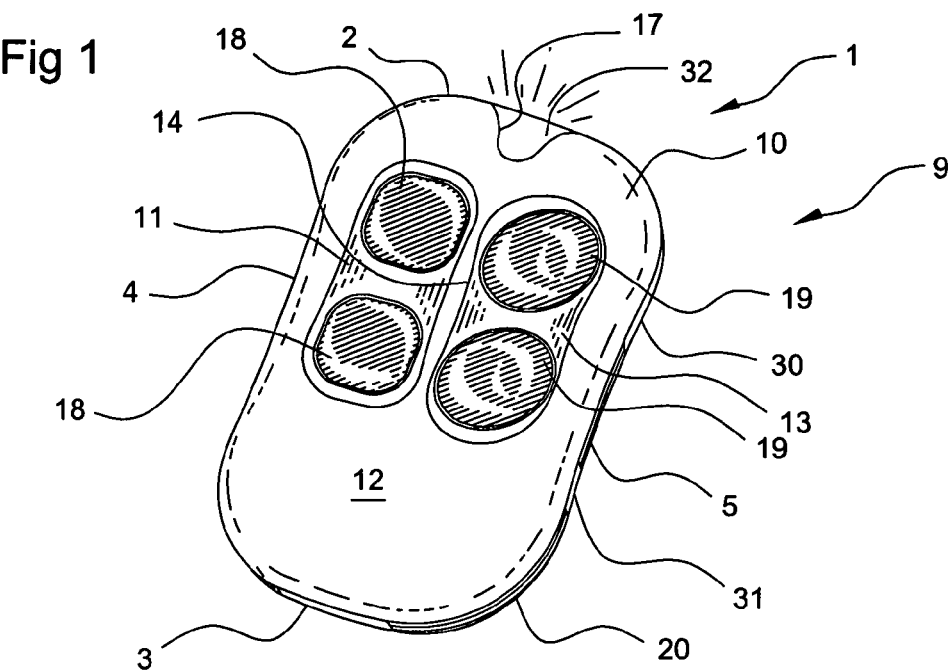
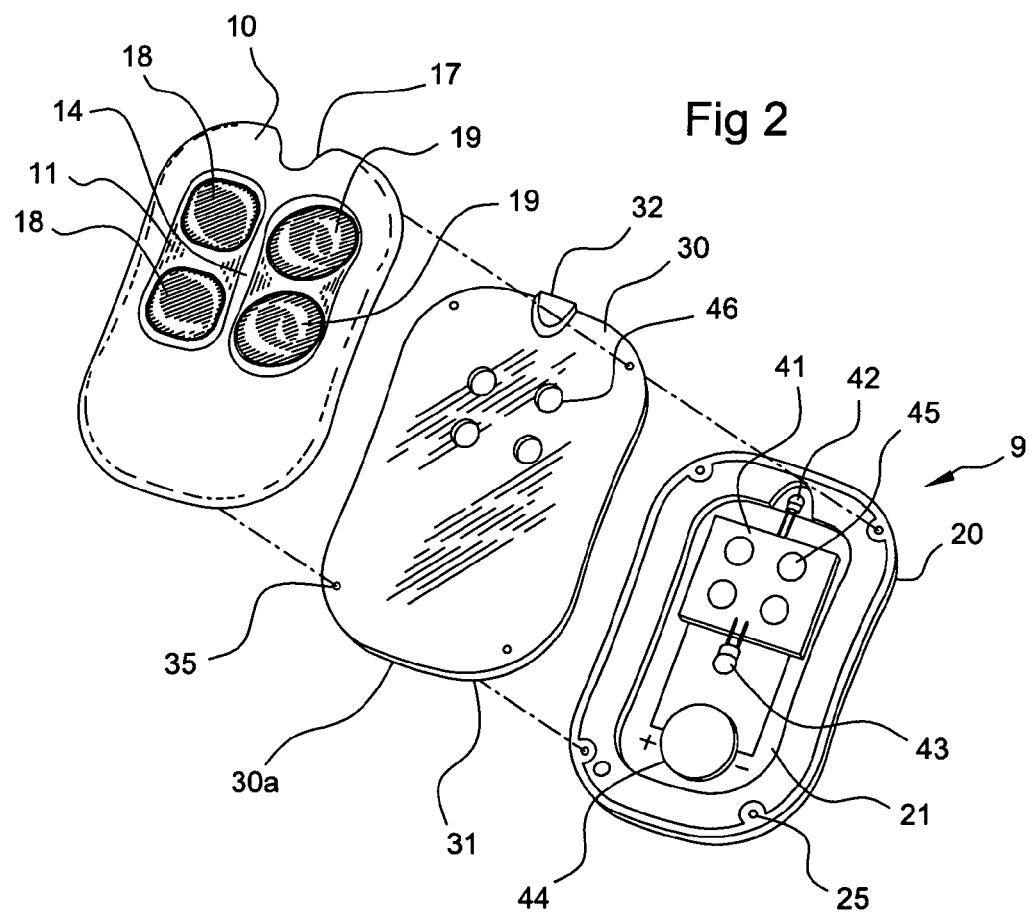

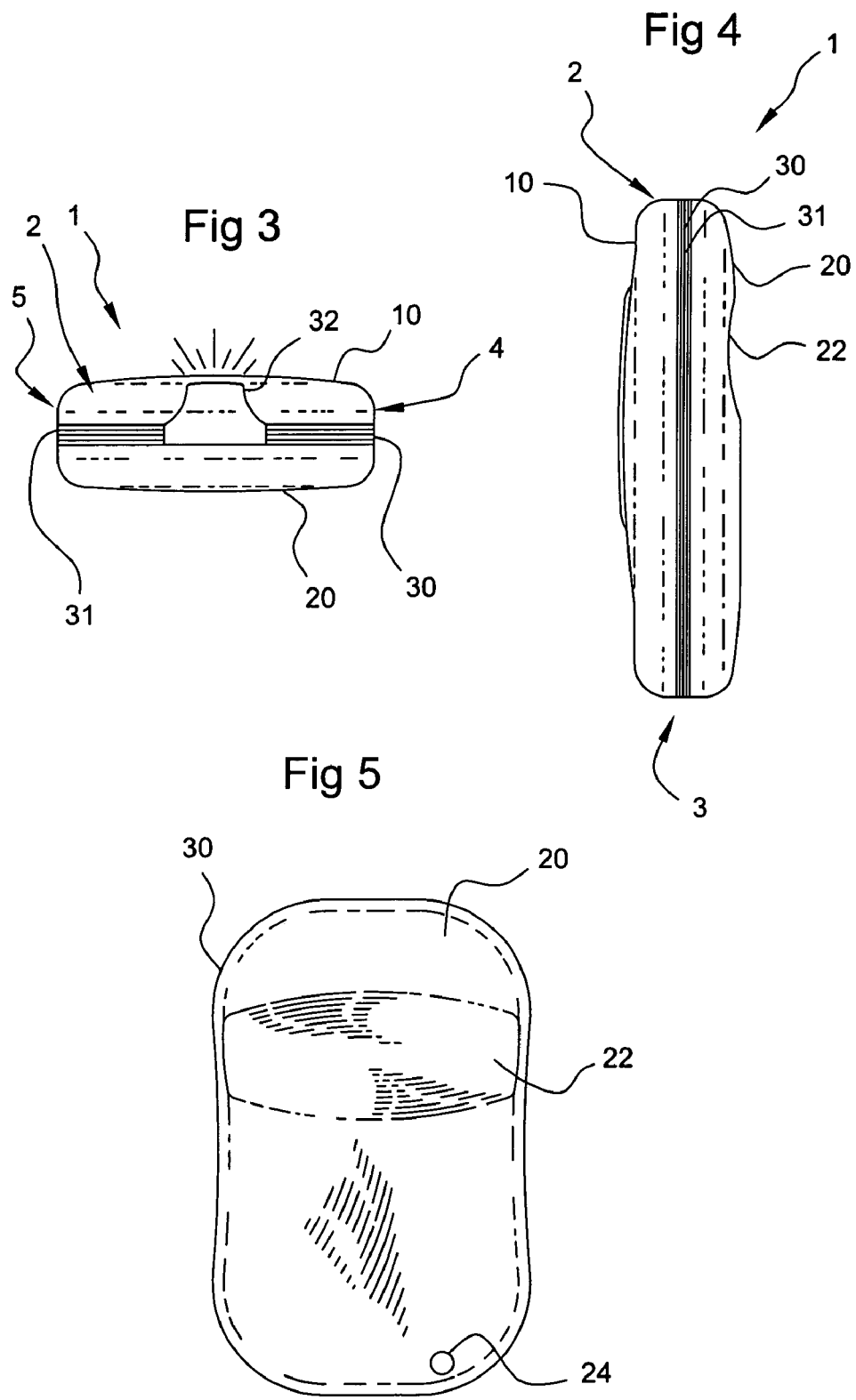

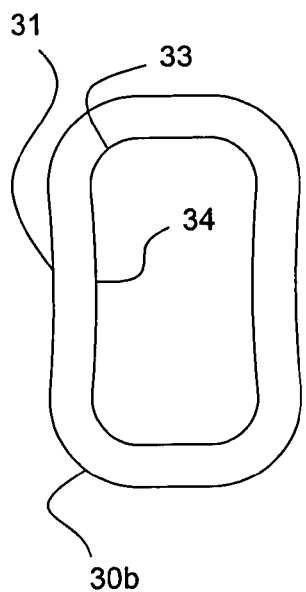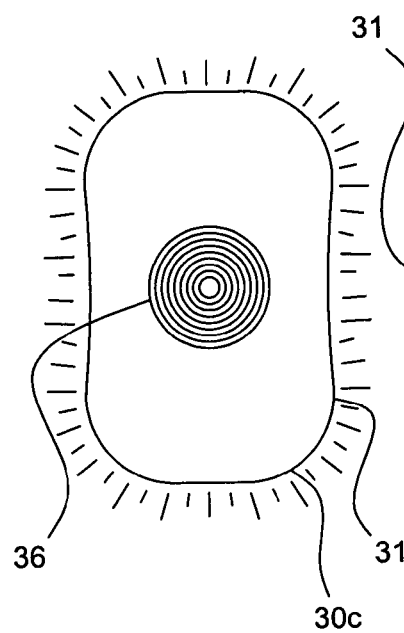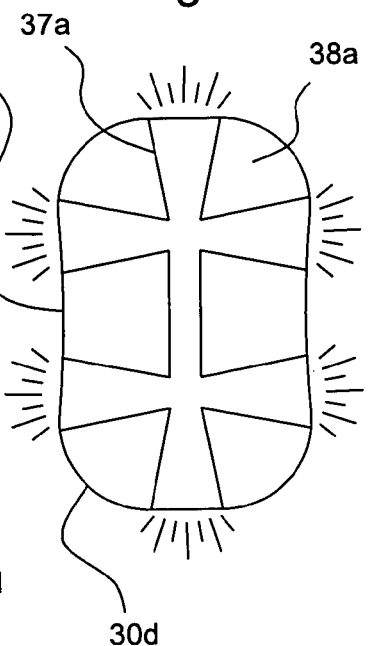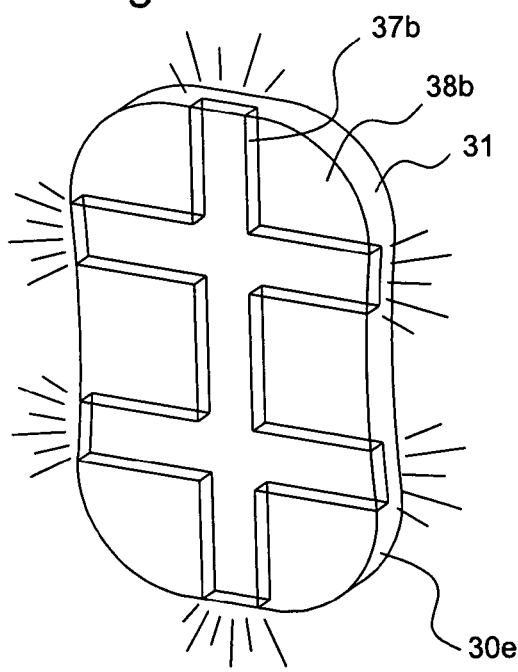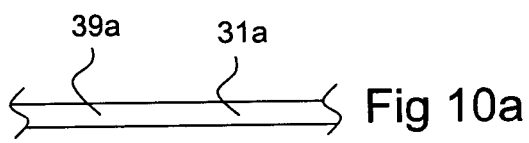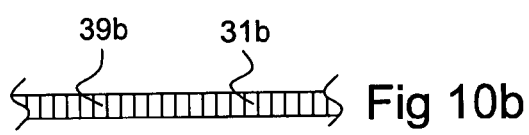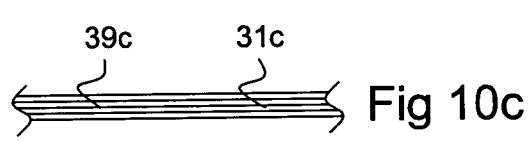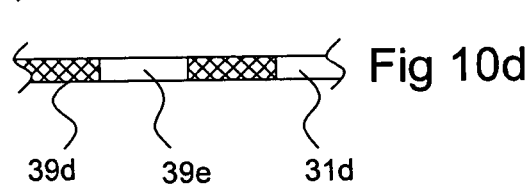

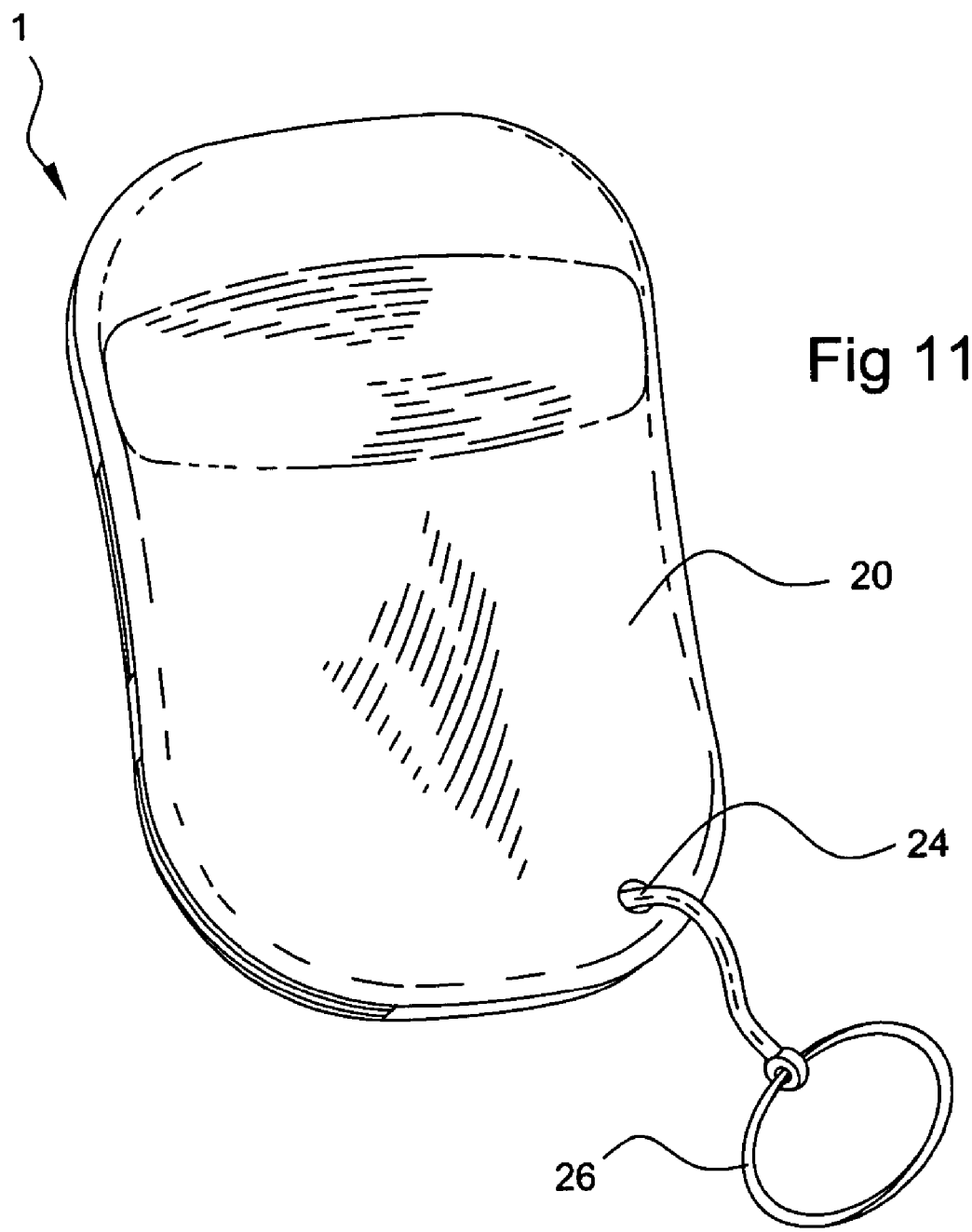

ILLUMINATED REMOTE CONTROL DEVICE

FIELD OF THE INVENTION

This invention relates to handheld wireless remote control devices to operate electronic devices, and more particularly, to remote control devices incorporating illumination.

BACKGROUND OF INVENTION

Remote control devices are finding varied uses for controlling one or more functions of electrical components, such as those within an automobile. A remote control is a device that enables a user, by actuation of a button on a handheld transmitter, to remotely control such operations as the locking/unlocking of a vehicle's doors, the setting of an alarm, and the starting of the engine. A simple remote control device comprises a transmitter having a single button to activate the transmitter. When the button is activated, the transmitter, using energy, such as, but not limited to radio frequency and infrared energy, transmits a transmitter identification (ID) code that is unique to the transmitter. A receiver, interconnected with the component to be activated, determines whether or not the received ID code matches a code that has been stored in the memory of the receiver beforehand. When a match is determined to exist between the codes, a predetermined function of a device to be controlled is activated. The predetermined function of the device to be controlled corresponds to execution of a specific function, such as the unlocking of a lock mechanism of a vehicle door, wherein the lock mechanism performs a locking operation and an unlocking operation alternately when the ID code is received repeatedly.

It is not uncommon for the remote control device to be operated in a dark location or at night. The operation of a single-button remote control device is not particularly hindered by low light conditions, but with the increasingly popular multi-button remote control device, button selection and operation is significantly hampered. The operator has to rely on touch and memory in order to correctly select a particular control button. This would be extremely difficult for a user to operate the remote control device if she is unfamiliar with the automobile, such as in the case of a rental car or a borrowed car.

It is becoming popular for remote control devices to be configured for a dual purpose as a key holder. It is also common for a user to use a key in the dark or low light condition. In situations where a lock is not well illuminated, it is particularly difficult to insert the key into the lock positioned in the correct orientation, or to operate the lock in an emergency.

Accordingly, there is a need for a remote control device that provides the user with an increased ability for operation in low light conditions.

SUMMARY OF INVENTION

The present invention provides a handheld wireless remote control device with illumination. In accordance with an embodiment of the present invention, a handheld remote control device comprises a light source that provides illumination in the visible spectrum that projects from the remote control device housing suitable for a particular purpose, such as, but not limited to, to illuminate a nearby object, to provide a beacon, and/or to provide a pleasing light display. The illumination is projected from one or more areas of the remote control device, such as, but not limited to, a forward edge or surface such as to illuminate a facing target, as well as an adjacent edge or surface such as to illuminate an adjacent target, such as the hand holding the remote control device. In particular, the illumination reflecting off of the hand provides the user with increased ability to visualize the operating buttons.

The illumination also provides a lighting effect that is visually appealing to the user and to those in view to providing a pleasurable visceral response. The illumination can be used as a beacon, such that the user can be identified in a dark location by the unique configuration of the lighting effect.

In accordance with another embodiment of the present invention, the handheld remote control device provided above further comprises a component attachment feature, such as, but not limited to, a key chain for the attachment of keys to the remote control device. The illumination may be used in complimentary arrangement with the attached component, such as to illuminate a lock into which an attached key is inserted.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentality's, procedures, and combinations particularly pointed out in the appended claims.

BRIEF DESCRIPTION OF DRAWINGS

FIGS. 1 and 2 show a front perspective view and an exploded perspective view, respectively, of an illuminated remote control device, in accordance with an embodiment of the present invention;

FIGS. 3–5 show front, side and back views of the illuminated remote control device in accordance with the embodiment of FIG. 1;

FIG. 6 is a front view of an embodiment of a light guide comprising a translucent material of uniform configuration in the form of a frame having a light guide aperture, in accordance with the present invention;

FIG. 7 is a front view of an embodiment of a light guide comprising a translucent material with a series of diffraction ridges, in accordance with the present invention;

FIG. 8 is a front view of an embodiment of a light guide comprising a series of translucent channels and light modifying areas, in accordance with the present invention;

FIG. 9 is a front perspective view of an embodiment of a light guide comprising a series of translucent channels and light modifying areas, in accordance with the present invention;

FIGS. 10*a*–10*d* are edge views of embodiments of light guide edges, in accordance with the present invention; and FIG. 11 is a rear perspective view of an illuminated remote control device comprising a key ring, in accordance with an embodiment of the present invention.

DESCRIPTION

In the following detailed description, reference is made to the accompanying drawings which form a part hereof wherein like numerals designate like parts throughout, and in which is shown by way of illustration specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Embodiments of an illuminated remote control device 1 is provided below. It is understood that these embodiments are provided as examples of various embodiments for practicing the present invention, but are not intended to limit the present invention thereto. The following description is primarily directed to an illuminated remote control device resembling a rectangle having two sides and four edges. Embodiments of an illuminated remote control device can take many forms, including the form of a geometric shape, such as, but not limited to, a square, rectangle, triangle, and circle, without departing from the scope of the present invention.

FIG. 1 shows a front perspective view of an illuminated remote control device 1 providing illumination in the visible spectrum, in accordance with an embodiment of the present invention. The illuminated remote control device 1 provides the functionality of a wireless signal transmitter and a light source. The light illuminates and projects from one or more translucent portions 32 of one or more edges or surfaces of the illuminated remote control device 1.

The illuminated remote control device 1, in accordance with an embodiment of the present invention, comprises: a housing 9 having an outer surface 12 and a cavity (not shown) therein, the housing 9 defining at least one translucent portion 32 adapted for the transmission of light from the cavity to the outer surface 12; at least one control feature 18 adjacent the outer surface; transmitter electronics (not shown) housed in the cavity and adapted for wireless communication and operable by the at least one control feature 18; and at least one light source (not shown) operable by the at least one control feature 18 and adapted to emit light in the visible spectrum into the cavity and through the at least one translucent portion.

FIG. 2 shows a front perspective view and an exploded perspective view, respectively, of an illuminated remote control device 1 providing illumination in the visible spectrum, in accordance with an embodiment of the present invention. The illuminated remote control device 1 provides the functionality of a wireless signal transmitter and a light source. The light illuminates and projects from one or more portions of one or more edges or surfaces of the illuminated remote control device 1.

The illuminated remote control device 1 comprises a two-piece housing 9, comprising a first side 10 and a second side 20, and a light guide 30 there between, defining a first edge 2, a second edge 3, a third edge 4 and a fourth edge 5. The first side 10 and the second side 20 substantially conform to the periphery of the light guide 30. In the embodiment of FIG. 1, the light guide 30 forms a continuous band around the perimeter of the illuminated remote control device 1. The light guide 30 provides a conduit to direct light produced within the illuminated remote control device 1 to one or more portions of the first side 10, first edge 2, second edge 3, third edge 4 and/or the fourth edge 5, where from the light projects from the housing 9.

The housing 9 is adapted to contain one or more light sources 42, 43 and associated illumination and transmitter electronics 41 and a power source 44. The one or more light sources 42, 43 comprise any suitable illumination-generating component, such as, but not limited to, a light emitting diode (LED). Light emitting diodes are available that emit various colors of the visible spectrum, such as, but not limited to, blue and red. The various colors can be used advantageously, such as the use of red to preserve night vision, or combination of colors for a pleasing or alerting lighting effect.

The power source 44 comprises any suitable energy storage component, such as, but not limited to, a battery, of sufficient energy to power the one or more light sources 42,43 and the electronics 41. Suitable battery sources include, but are not limited to, 3-volt lithium coin cell batteries available from Panasonic bearing the CR2016 marking.

In an embodiment of the invention, light is caused to project from the illuminated remote control device 1 in a relatively concentrated manner so as to provide a relatively more intense lighting effect. Referring again to FIGS. 1 and 2, the first edge 2 comprises a light lens 32 that is either integral with the light guide 30 or coupled thereto. A portion of the first edge 2 and the first side 10 comprises a conformal lens aperture 17 into which the light lens 32 extends. The light lens 32 focuses and guides the light to project out of a portion of both the first edge 2 the first side 10. In other embodiments, a light lens is provided on one or more portions of the illuminated remote control device 1, including the surfaces and edges, singularly or in combination.

Embodiments in accordance with the invention comprise tactile features to assist in the handling and operation of the illuminated remote control device 1. Referring again to FIGS. 1 and 2, the first side 10 further comprises a first recessed portion 11 and a second recessed portion 13, and a ridge 14 there between. The first recessed portion 11 is adapted to accept a pair of switch elements in the form of first control buttons 18 therein. The second recessed portion 13 is adapted to accept a pair of switch elements in the form of second control buttons 19 therein. The first and second control buttons 18,19 project from the first and second recessed portions 11,13, respectively, to an elevation substantially flush with the first surface 12. The first and second control buttons 18, 19 include engaging elements (not shown) that extend within the housing 9 to engage switch elements therein. The switch elements open and close a circuit comprising the power source 44, the one or more light sources 42,43, and/or the electronics 41.

The first and second control buttons 18,19 comprise tactile features to assist in button differentiation. The first control buttons 18 have a generally square shape in comparison to an oval shape of the second control buttons 19. Other tactile features may be incorporated to assist in the operation of the illuminated remote control device 1, such as, but not limited to, shapes of the buttons and textures of the first and second control buttons 18,19.

The ridge 14 also provides a tactile feature that assists in button differentiation by providing a positioning reference separating the first control buttons 18 from the second control buttons 19.

FIGS. 3–5 show front, side and back views of the illuminated remote control device 1 in accordance with the embodiment of FIG. 1. The front light lens 32 provides an expanded region from which intensified illumination projects, including from at least a portion of the first edge 2 and at least a portion of the first side 10. The illumination projects from the light guide edge 31 in various ways that will be further discussed below.

In one embodiment of the present invention, the second side 20 comprises a back recessed portion 22 that assists the user in handling and operation of the illuminated remote control device 1. In yet another embodiment of the present invention, the second side 20 further comprises an attachment aperture 24 that is adapted to accept a coupling means of an accessory, such as, but not limited to, a key chain, as will be discussed below.

The first side 10 and the second side 20 can comprise a variety of materials, such as metal, plastic, or other suitable materials. Aluminum, for example, provides a desirable combination of lightweight, durability, and attractive finish. The first side 10 and the second side 20 protect the internal components and therefore must have appropriate structural properties. The first side 10 and the second side 20, being separate pieces, can be made from different materials and/or different colors suitable for a particular purpose, one of which is aesthetics.

Referring again to FIG. 2, the illuminated remote control device 1 is assembled by positioning the light guide 30 between the front side 10 and the second side 20. Fastening features 25 are provided to enable the light guide 30 and the second side 20 to be coupled to the first side 10. Example of fastening features include, but are not limited to, mating peg holes and pegs (not shown) positioned about the periphery of either the first side 10 and/or the bottom side 20 to assist in the alignment for screw fastening, gluing, and ultrasonic welding, among others. Button apertures 46 in the light guide 30 enable button projections (not shown) to pass through the light guide 30 to contact appropriate switch elements 45. Fastening apertures 35 are provided in the light guide 30 suitable for a particular fastening features between the first side 10 and the second side 20.

The second side 20 is provided with a cavity 21 adapted to accommodate electrical components comprising one or more light sources 42,43, a power source 44, electronics 41, and push button contacts 45. The push button contacts 45 comprise any suitable contact switch element, such as, but not limited to, a tactile flex dome switch element. The push button contacts 45 are operable to close a circuit including the power source 44, the one or more light sources 42,43, and the electronics 41. Pressure applied to the flex dome, such as from the depression of a control button 18,19, causes the flex dome to collapse from a convex to a concave configuration and to come into contact with a switch element, thereby closing the circuit. When the pressure is removed, the flex dome returns to its convex position breaking contact with the power source and returning the circuit to the off configuration.

In the embodiment as shown in FIG. 2, a first light source 42 provides illumination to the light lens 32 and/or portions of the light guide 30. A second light source 43 provides illumination to one or more portions of the light guide 30. It is understood that one or more light sources can be used for a particular purpose and is not limited to the configuration shown. The first and second light sources 42,43 can be any suitable light source for the particular purpose, including, but not limited to, incandescent and light emitting diode (LED).

In operation, depressing either one or more first and second push buttons 18, 19 closes the electrical circuit to activate the electronics 41 for the transmitter and/or activating the one or more light sources 42, 43. Electronic logic enables a variety of illumination possibilities suitable for a particular purpose. Examples of illumination possibilities include, but are not limited to, one of the first push buttons 18 activates only the first light source 42, and the other first push button 18 activates the second light source 43. It is understood that various combinations of activating the one or more light sources 42,43 is possible and within the scope of the present invention.

It is understood that various features can be incorporated into the light guide 30 suitable for a particular purpose of guiding the illumination to predetermined one or more portions of the illuminated remote control device 1. Referring again to FIG. 2, in one embodiment in accordance with the present invention, the light guide 30a is comprised of a translucent material in a planar sheet configuration. Generally, light impinging a central portion of a planar sheet will substantially uniformly disperse to the edge 31.

FIG. 6 is a top view of another embodiment of a light guide 30b comprising a translucent material of a planar sheet configuration having a light guide aperture 33, in accordance with the present invention. The light guide aperture 33 provides additional internal volume to accommodate electronics 41 or other components and/or provide access for a centrally positioned light source. The light guide aperture 33 provides an internal edge 34 to act as an entry conduit for the illumination from the light source 42, 43.

FIG. 7 is a top view of another embodiment of a light guide 30c comprising a translucent material of a planar sheet configuration with a series of diffraction ridges 36, in accordance with the present invention. The diffraction ridges 36 assist in the distribution of the illumination throughout the light guide 30c and substantially uniformly exiting out of the light guide edge 31.

FIG. 8 is a top view of another embodiment of a light guide 30d comprising a series of translucent channels 37a and light modifying portions 38a, in accordance with the present invention. The translucent channels 37a guide or transmit illumination at predetermined portions of the light guide edge 31. The light modifying portions 38a are configured to change, diminish and/or block the light transmission from portions of the light guide edge 31 for a predetermined lighting effect.

FIG. 9 is a front perspective view of another embodiment of a light guide 30e comprising a series of translucent channels 37b and light modifying areas 38b, in accordance with the present invention. The translucent channels 37b guide the illumination to predetermined portions of the light guide edge 31. The light modifying areas 38b are configured to change, diminish and/or block the illumination from portions of the light guide edge 31 for a desired predetermined lighting effect.

FIGS. 10a–10d are edge views of portions of embodiments of a light guide edge 31, in accordance with the present invention. FIG. 10a shows a light guide edge 31a having a substantially smooth surface 39a that is uniform along the perimeter of the light guide, that provides a substantially uniform lighting effect along the perimeter.

FIG. 10b shows a light guide edge 31b comprising a vertically grooved surface 39b that modifies, such as, but not limited to, bending and scattering, the illumination emanating from the light guide edge 31b.

FIG. 10c shows a light guide edge 31c comprising a horizontally grooved surface 39c that modifies the illumination emanating from the light guide edge 31c.

FIG. 10d shows a light guide edge 31d comprising areas of different illumination properties, such as, but not limited to, a smooth surface 39e and a cross-hatch grooved surface 39d, and the embodiments shown in FIGS. 8 and 9. The a light guide edge 31d creates a predetermined lighting effect.

The embodiments of FIGS. 1–5 show the light guide 30 comprising a light lens 32 that is assembled within a complimentary conformal lens aperture 17 of the top surface 10. The embodiments of FIGS. 6–9 show light guides 30b–30e having no light lens 32 integral to the light guides 30b–30e. It is understood that such embodiments may also be utilized with embodiments of the remote control device 1 that comprise a separate light lens, or embodiments with a first side 10 having no conformal lens aperture 17. It is understood that the scope of the invention is not limited to a particular arrangement of the illuminated remote control device 1 having or not having a light lens 32 and a conformal lens aperture 17.

It is also understood that the scope of the invention is not limited to an illuminated remote control device 1 comprising a light guide as a singular piece, but also comprises illuminated remote control devices 1 comprising one or more translucent windows or inserts that are adapted to project within corresponding apertures in the housing 9, such as, but not limited to, one or more light lenses 32 and corresponding conformal lens apertures 17.

FIG. 11 is a perspective view of the illuminated remote control device 1 further comprising an attached accessory, such as a key ring 26, in accordance with an embodiment of the present invention. The key ring 26 is adapted to couple with the attachment aperture 24 on the second side 20 of the illuminated remote control device 1.

The invention is not intended to be limited by the particular geometry, location of illumination emission, or components depicted herein, which are illustrative. It is further understood that the present invention is not limited to illuminated remote control devices having an attachment aperture that is adapted to accept a coupling feature of an accessory. It is further understood that the present invention is not limited to illuminated remote control devices having four control buttons or any particular combination of one or more control buttons.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. An illuminated remote control device, comprising:
    a housing having an outer surface and a cavity therein, the housing defining at least one translucent portion adapted for the transmission of light from the cavity to the outer surface, wherein the housing comprises a first side and a second side defining an aperture there between about a perimeter edge;
    at least one control feature adjacent the outer surface;
    transmitter electronics adapted for wireless communication and operable by the at least one control feature; and
    at least one light source operable by the at least one control feature and adapted to emit light in the visible spectrum into the cavity, the cavity adapted to contain the transmitter electronics and the at least one light source therein, the at least one translucent portion adapted to provide a conduit to guide light from the cavity to the outer surface, wherein the at least one translucent portion comprises:
    an aperture extending from the cavity to the outer surface; and
    a window coupled within the aperture and extending at least a portion of the length of the aperture, the window comprising a translucent material,
    wherein the window comprises a light guide positioned in the aperture between the first side and second side, the light guide having a light guide edge defining at least a portion of the perimeter edge, the light guide adapted to provide a conduit to guide light from the cavity to one or more portions of the outer surface.

2. The illuminated remote control device of claim 1, wherein the at least one control feature adjacent the outer surface comprises at least one first control button and at least one second control button; and wherein the first side further comprises:
    a first recessed portion and a second recessed portion adjacent the first recess portion, and a ridge there between, the first recessed portion adapted to accept the at least one first control button therein, and the second recessed portion adapted to accept the at least one second control button therein, the first and second control buttons adapted to project from the first and second recessed portions to an elevation substantially flush with the outer surface.

3. The illuminated remote control device of claim 1, wherein the second side comprises an accessory attachment aperture adapted to permit the coupling of a predetermined accessory to the housing.

4. The illuminated remote control device of claim 1, wherein the light guide comprises a substantially planar sheet of translucent material.

5. The illuminated remote control device of claim 1, wherein the light guide comprises a substantially planar sheet of a translucent material having a light guide aperture, the light guide aperture having an internal edge adapted to provide an entry conduit for the light from the cavity.

6. The illuminated remote control device of claim 1, wherein the light guide comprises a substantially planar sheet of a translucent material, at least a portion of which comprising a series of diffraction ridges adapted to distribute the light from the light source throughout the light guide and substantially uniformly about the perimeter edge.

7. The illuminated remote control device of claim 1, wherein the light guide comprises at least one translucent channel and at least one light modifying area, the translucent channel adapted to transmit light from the cavity to a predetermined portion of the perimeter edge, and the light modifying area adapted to change, diminish and/or block the light from predetermined portions of the perimeter edge.

8. The illuminated remote control device of claim 1, wherein the light guide edge comprises a substantially smooth surface.

9. The illuminated remote control device of claim 1, wherein the light guide edge comprises a plurality of vertical grooves adapted to modify the distribution of light emitting from the light guide edge.

10. The illuminated remote control device of claim 1, wherein the light guide edge comprises a plurality of horizontal grooves adapted to modify the distribution of light emanating from the light guide edge.

11. The illuminated remote control device of claim 1, wherein the light guide edge comprises portions having one of at least two different light transmission properties.

12. An illuminated remote control device, comprising:
    a housing having an outer surface and a cavity therein, the housing defining at least one translucent portion adapted for the transmission of light from the cavity to the outer surface, wherein the housing comprises a first side and a second side defining a perimeter edge;

at least one control feature adjacent the outer surface;

transmitter electronics adapted for wireless communication and operable by the at least one control feature; and at least one light source operable by the at least one control feature and adapted to emit light in the visible spectrum into the cavity, the cavity adapted to contain the transmitter electronics and the at least one light source therein, the at least one translucent portion adapted to provide a conduit to guide light from the cavity to the outer surface, wherein the at least one translucent portion comprises:

a light lens aperture extending from the cavity to the outer surface; and a light lens within the light lens aperture and adapted to provide a light conduit to at least a portion of the perimeter edge and at least a portion of the first side.

13. An illuminated remote control device, comprising:
at least one light source;
a power source;
a transmitter adapted for radio frequency communication with a receiver to control the operation of a device;
at least one switch;
a housing defining an outer surface and a cavity, the cavity adapted to house the at least one switch, power source, the at least one light source, and the transmitter, the housing comprising a first side and a second side defining a perimeter edge;
a control feature operable from the outer surface to operate the switch to close a circuit including the power source and one or more of the transmitter and the one or more light sources; and
a light guide defining at least a portion of the perimeter edge, the light guide adapted to provide a conduit for the transmission of light from the cavity to the outer surface of the housing.

14. The illuminated remote control device of claim 13, further comprising:
a light lens aperture extending from the cavity to a portion of the perimeter edge and a portion of the first side; and
a light lens within the light lens aperture and adapted to provide a light conduit to the portion of a perimeter edge and the portion of the first side.

15. The illuminated remote control device of claim 14, wherein the housing further comprises an accessory attachment aperture extending from the cavity to the outer surface.

16. The illuminated remote control device of claim 13, wherein the first side and second side define an aperture there between about the perimeter edge; the light guide coupled within the aperture between the first side and second side, the light guide having a light guide edge defining at least a portion of the perimeter edge, the light guide adapted to provide a conduit to guide light from the cavity to one or more portions of the outer surface.

17. The illuminated remote control device of claim 13, wherein the light guide comprises a substantially planar sheet of translucent material.

18. The illuminated remote control device of claim 13, wherein the light guide comprises a substantially planar sheet of a translucent material having a light guide aperture, the light guide aperture having an internal edge adapted to provide an entry conduit for the light from the light source.

19. The illuminated remote control device of claim 13, wherein the light guide comprises a substantially planar sheet of a translucent material, at least a portion of which comprising a series of diffraction ridges adapted to distribute the light from the cavity throughout the light guide and substantially uniformly about the perimeter edge.

20. The illuminated remote control device of claim 13, wherein the light guide comprises at least one translucent channel and at least one light modifying area, the translucent channel adapted to transmit light from the cavity to a predetermined portion of the perimeter edge, and the light modifying area adapted to change, diminish and/or block the light from predetermined portions of the perimeter edge.

21. The illuminated remote control device of claim 13, wherein the light guide edge comprises a substantially smooth surface.

22. The illuminated remote control device of claim 13, wherein the light guide edge comprises a plurality of vertical grooves adapted to modify the distribution of light emitting from the light guide edge.

23. The illuminated remote control device of claim 13, wherein the light guide edge comprises a plurality of horizontal grooves adapted to modify the distribution of light emanating from the light guide edge.

24. The illuminated remote control device of claim 13, wherein the light guide edge comprises portions having one of at least two different light transmission properties.

25. An illuminated remote control device, comprising:
a housing having an outer surface and a cavity therein, the housing defining at least one translucent portion adapted for the transmission of light from the cavity to the outer surface;
at least one control feature adjacent the outer surface;
transmitter electronics adapted for radio frequency communication with a receiver to control the operation of a device and operable by the at least one control feature; and
at least one light source operable by the at least one control feature and adapted to emit light in the visible spectrum into the cavity, the cavity adapted to contain the transmitter electronics and the at least one light source therein, the at least one translucent portion adapted to provide a conduit to guide light from the cavity to the outer surface,
wherein the at least one translucent portion comprises:
an aperture extending from the cavity to the outer surface; and
a window coupled within the aperture and extending at least a portion of the length of the aperture, the window comprising a translucent material, wherein the housing comprises a first side and a second side defining an aperture there between about a perimeter edge; and wherein the window comprises a light guide positioned in the aperture between the first side and second side, the light guide having a light guide edge defining at least a portion of the perimeter edge, the light guide adapted to provide a conduit to guide light from the cavity to one or more portions of the outer surface.

26. The illuminated remote control device of claim 25, wherein the at least one control feature adjacent the outer surface comprises at least one first control button and at least one second control button; and wherein the first side further comprises:
a first recessed portion and a second recessed portion adjacent the first recess portion, and a ridge there between, the first recessed portion adapted to accept the at least one first control button therein, and the second recessed portion adapted to accept the at least one second control button therein, the first and second control buttons adapted to project from the first and second recessed portions to an elevation substantially flush with the outer surface.

27. The illuminated remote control device of claim 25, wherein the second side comprises an accessory attachment aperture adapted to permit the coupling of a predetermined accessory to the housing.

28. The illuminated remote control device of claim 25, wherein the light guide comprises a substantially planar sheet of translucent material.

29. The illuminated remote control device of claim 25, wherein the light guide comprises a substantially planar sheet of a translucent material having a light guide aperture, the light guide aperture having an internal edge adapted to provide an entry conduit for the light from the cavity.

30. The illuminated remote control device of claim 25, wherein the light guide comprises a substantially planar sheet of a translucent material, at least a portion of which comprising a series of diffraction ridges adapted to distribute the light from the light source throughout the light guide and substantially uniformly about the perimeter edge.

31. The illuminated remote control device of claim 25, wherein the light guide comprises at least one translucent channel and at least one light modifying area, the translucent channel adapted to transmit light from the cavity to a predetermined portion of the perimeter edge, and the light modifying area adapted to change, diminish and/or block the light from predetermined portions of the perimeter edge.

32. The illuminated remote control device of claim 25, wherein the light guide edge comprises a substantially smooth surface.

33. The illuminated remote control device of claim 25, wherein the light guide edge comprises a plurality of vertical grooves adapted to modify the distribution of light emitting from the light guide edge.

34. The illuminated remote control device of claim 25, wherein the light guide edge comprises a plurality of horizontal grooves adapted to modify the distribution of light emanating from the light guide edge.

35. The illuminated remote control device of claim 25, wherein the light guide edge comprises portions having one of at least two different light transmission properties.

36. An illuminated remote control device, comprising:
  a housing having an outer surface and a cavity therein, the housing defining at least one translucent portion adapted for the transmission of light from the cavity to the outer surface;
  at least one control feature adjacent the outer surface;
  transmitter electronics adapted for radio frequency communication with a receiver to control the operation of a device and operable by the at least one control feature; and
  at least one light source operable by the at least one control feature and adapted to emit light in the visible spectrum into the cavity, the cavity adapted to contain the transmitter electronics and the at least one light source therein, the at least one translucent portion adapted to provide a conduit to guide light from the cavity to the outer surface, wherein the housing comprises a first side and a second side defining a perimeter edge; and wherein the at least one translucent portion comprises:
  a light lens aperture extending from the cavity to the outer surface; and
  a light lens within the light lens aperture and adapted to provide a light conduit to at least a portion of the perimeter edge and at least a portion of the first side.

* * * * *